United States Patent
Wilson

(10) Patent No.: US 6,788,287 B2
(45) Date of Patent: Sep. 7, 2004

(54) DUAL-DIMENSION CURSOR CONTROL PAD

(76) Inventor: David M. Wilson, 10335 Marinette Ave., Hudson, FL (US) 34667

( * ) Notice: Subject to any disclaimer, the term of this patent is extended or adjusted under 35 U.S.C. 154(b) by 38 days.

(21) Appl. No.: 10/298,741

(22) Filed: Nov. 18, 2002

(65) Prior Publication Data

US 2004/0095331 A1 May 20, 2004

(51) Int. Cl.$^7$ ................................................ G09G 5/00
(52) U.S. Cl. ...................................... 345/156; 345/157
(58) Field of Search ................................ 345/156, 157, 345/158, 163, 164, 165, 166, 167, 184, 161; 74/471 XY; 33/1 M

(56) References Cited

U.S. PATENT DOCUMENTS

| | | | | |
|---|---|---|---|---|
| 4,670,743 A | * | 6/1987 | Zemke | 345/157 |
| 4,754,268 A | * | 6/1988 | Mori | 345/163 |
| 4,782,327 A | * | 11/1988 | Kley et al. | 341/2 |
| 5,293,158 A | * | 3/1994 | Soma | 345/161 |
| 5,704,037 A | * | 12/1997 | Chen | 345/184 |
| 5,771,037 A | * | 6/1998 | Jackson | 345/157 |
| 6,282,798 B1 | * | 9/2001 | Yeh et al. | 33/1 M |
| 6,323,844 B1 | * | 11/2001 | Yeh et al. | 345/166 |
| 6,326,948 B1 | * | 12/2001 | Kobachi et al. | 345/157 |
| 6,393,165 B1 | * | 5/2002 | Yeh | 382/325 |

* cited by examiner

Primary Examiner—Xiao Wu
(74) Attorney, Agent, or Firm—Dennis L. Cook, Esq.

(57) ABSTRACT

A mechanical input to electrical output device such as a touch pad module for controlling the movement of a cursor comprising two movable plates attached to a fixed plate and a scanning device. The tracks on the top and bottom of the middle movable plate allows for an "X" axis movement of the top plate and an "Y" axis movement of the middle plate that slides on the fixed plate. This combination allows the scanning device to read the movement of the top plate through a slot (cut-out) on the fixed plate and a slot (cut-out) on the middle moveable plate from underneath all three plates. Consequently, the scanning device is able to track or read the movement or position of the top plate in two dimensions.

5 Claims, 3 Drawing Sheets

DUAL-DIMENSION CURSOR CONTROL PAD

FIELD OF THE INVENTION

This invention is a mechanical input to electrical output device and generally relates to a touch pad for controlling the movement of a cursor on a visual display. More particularly, it relates to a touch pad module mountable on a wrist band.

BACKGROUND OF THE INVENTION

As part of the miniaturization of computer products, touch pads have been developed to perform the same function as a mouse device, i.e. to control the movement of a cursor in a visual display. As touch pads have a reduced size, they are advantageously used in notebook computers, mounted on a keyboard panel. patent application Ser. No. 10/243,082, filed by David Wilson, the same inventor as in this disclosure, disclosed a new IR mouse design that used the raising of fingers to break a light beam as a replacement for the typical buttons on a conventional mouse. That application also disclosed a wristband mouse as an embodiment. The wristband mouse uses the light beam interruption as a method of input as well as a touch pad mounted on the wristband to control cursor movement. It has now been discovered that a new design for a touch pad, as disclosed in this application, will work even better and give more certain and accurate cursor control.

User-friendly input devices for computers are well known in the art. One of the several types of input devices is the familiar "mouse." When combined with a graphical user interface, a mouse can be much easier to use than typed keyboard commands. By moving the mouse across a surface, an operator causes a cursor to move correspondingly on a display screen. The mouse has been accepted as a "user-friendly" input device providing a simple means for both experienced and novice computer users to interact with a computer. However, mice are limited because they generally require a flat rolling surface, e.g. a tabletop, on which to operate. Thus, a mouse is not well suited for use in confined spaces or where little or no surface space exists such as with a kiosk or other touch screen application. A mouse also includes mechanical parts that can become jammed, that can become dirty or worn, and that generally cannot be sealed from outside contamination.

Various alternative input devices have been proposed in answer to the long-existing need for an input device more suitable for use in situations where space is limited or a flat rolling surface is unavailable. These alternative input devices include devices commonly referred to as track balls, track pens and track point devices, as well as various devices that sense the position of a pointing object on a position-sensing surface. Devices which sense the position of a pointing object on a sensing surface generally have the advantages of being simple to use, reliable, rugged, compact and easy to integrate with current computers and other computing devices.

Numerous types of input devices utilize a position-sensing surface. For example, U.S. Pat. No. 3,886,311, issued to Rodgers et al. (May 27, 1975), discloses a writing pen for detecting a time varying electrostatic field produced by a writing tablet. U.S. Pat. No. 4,672,154, also issued to Rodgers et al. (Jun. 9, 1987), discloses a cordless stylus that emits a directional electric field from the tip of a conductive pen cartridge sensed by a digitizer tablet having an X–Y coordinate system. U.S. Pat. No. 4,680,430, issued to Yoshikawa et al. (Jul. 14, 1987), discloses a tablet-like coordinate detecting apparatus including a resistive film for determining the coordinate position data of a point on a plane indicated by the touch of a finger tip or other load. U.S. Pat. No. 4,103,252, issued to Bobick (Jul. 25, 1978), discloses a position sensing tablet with electrodes located on the boundaries of a sensing region which detects a human touch by the change in capacitive charge caused by the touch which varies the time constant of an RC network which is part of an oscillator. U.S. Pat. No. 4,736,191, issued to Matzke (Apr. 5, 1988), discloses a touch activated control device comprising individual conductive plates wherein a user's touch on the dielectric layer overlaying the plates is detected by individually charging and discharging each of the sectors in the plates in a sequential manner to determine the increased capacitance of the sector. U.S. Pat. No. 4,550,221, issued to Mabusth (Oct. 29, 1985), discloses a touch-sensitive control device which translates touch location to output signals and which includes a substrate that supports first and second interleaved, closely spaced, non-overlapping conducting plates. U.S. Pat. No. 4,639,720, issued to Rympalski et al. (Jan. 27, 1987), discloses an electronic sketch pad which contains a graphics input pad having an array of transparent capacitive pixels, the capacitance characteristics of which are changed in response to the passing of a conductive tipped stylus over the surface of the pad. European Patent Publication 574,213, to Miller (filed Jul. 6, 1993, published Dec. 15, 1993), discloses a proximity sensor that includes a sensor matrix array which senses changes in capacitance between horizontal and vertical conductors connected to the position-sensing pad to determine x, y & z position information).

Among recent additions to the position-sensing pad art is U.S. Pat. No. 5,305,017 to Gerpheide (Apr. 19, 1994). The devices and methods of the Gerpheide patent include a touch sensitive input pad upon which a user conveniently inputs position information with a finger. In operation, the user's fingertip is brought in close proximity to the top surface of the position-sensing surface of the touch sensitive pad. The device of the Gerpheide patent detects the position of the fingertip in the horizontal ("x") and vertical ("y") directions of the touch pad, as well as the finger's proximity in the z direction in relation to the sensing surface. A device with a relative position sensing surface which is primarily operated by the touch of an operator's finger is commonly called a touch pad. In addition to a finger, Gerpheide's and many other touch pads can also be operated by other conductive objects.

Another recent example of prior art is U.S. Pat. No. 6,393,165 issued to Yeh (May 21, 2002) titled "Touch Pad Module for Controlling a Cursor" which discloses a touch pad module for controlling the movement of a cursor includes a plate, two resilient arms coplanar with the plate, each of the resilient arms having a free end part opposite to an end formed integrally with the plate, each of the resilient arms being bendable to permit the free end part to resiliently move away from the plane of the plate, a touch control region formed at a front side of said plate, a control circuit unit disposed opposite to the touch control region at a rear side of the plate, and a switching unit provided on a rear side of each of the resilient arms and electrically connected to the control circuit unit. The switching unit has a movable contact member projecting resiliently from the rear side of the corresponding one of the resilient arms.

Touch pads detect a finger placed on or near the sensing surface and translate movement of the finger into corresponding movement of a cursor on a display screen. One advantage of using a touch pad as an input device is space conservation. More specifically, the touch pad can be fixed in place and an operator can still manipulate a cursor on a display screen. This characteristic is very important when space is at a premium.

However, the touch pads described in the prior art have various disadvantages, especially in attempts to use existing touch pads for particular applications. First, existing touch pads, even those with enter zones on the touch pad surface, require a combination of operator taps on the surface to send a "mouse button click" or "enter/select" command to a host computer. For example, a slow and hard, down-and-up tap motion of the finger is required by some touch pads to generate a "mouse button click" command. Although convenient and efficient for expert users, the appropriate timing and force for the taps of a given pad take time to learn and can be confusing and even painful for novice users and even expert users on a new system. Furthermore, there are people who, because of physical limitation, are unable to perform the tap combinations required on existing touch pads, or the double-click combination required by existing mouse devices.

All the above referenced touch pads employ some type of capacitance tracking in order to sense movement of the operator's finger when he/she desires to move the cursor. This creates jerky and inaccurate movements which many times frustrate the operator. Consequently, touch pads have not readily replaced the more accurate track ball type of mouse in spite of the size advantage of touch pads. The combination of the touch pad of this disclosure along with the IR mouse of the above-mentioned patent application finally allows for an easy to use, compact computer input device that is as accurate and precise as larger devices.

SUMMARY OF THE INVENTION

The main object of the present invention is to provide a unitary touch pad module that can overcome the above-mentioned disadvantages. The current embodiment of the Duel-Dimension Cursor Control Pad disclosed herein, is a touch pad module for controlling the movement of a cursor comprising two movable plates attached to a fixed plate and a scanning device such as an optical laser scanner, Infrared scanner or other scanners well known in the art. The tracks on one movable plate allows for an "X" axis movement of this plate and an "Y" axis movement of the second plate that slides on the fixed plate. This combination allows the scanning device to read the movement of the first plate through a slot (cut-out) on the fixed plate and a slot (cut-out) on second moveable plate from underneath all three plates. Consequently, the scanning device is able to track or read the movement or position of the first plate in two dimensions.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE INVENTION

As discussed above, the Duel-Dimension Cursor Control Pad disclosed herein, is a touch pad module for controlling the movement of a cursor based on a plate assembly, a scanning device, and associated circuitry. The current embodiment is described below as an example but those skilled in the art will recognize modifications in specific components can be made without departing from the present invention.

Figure 1:
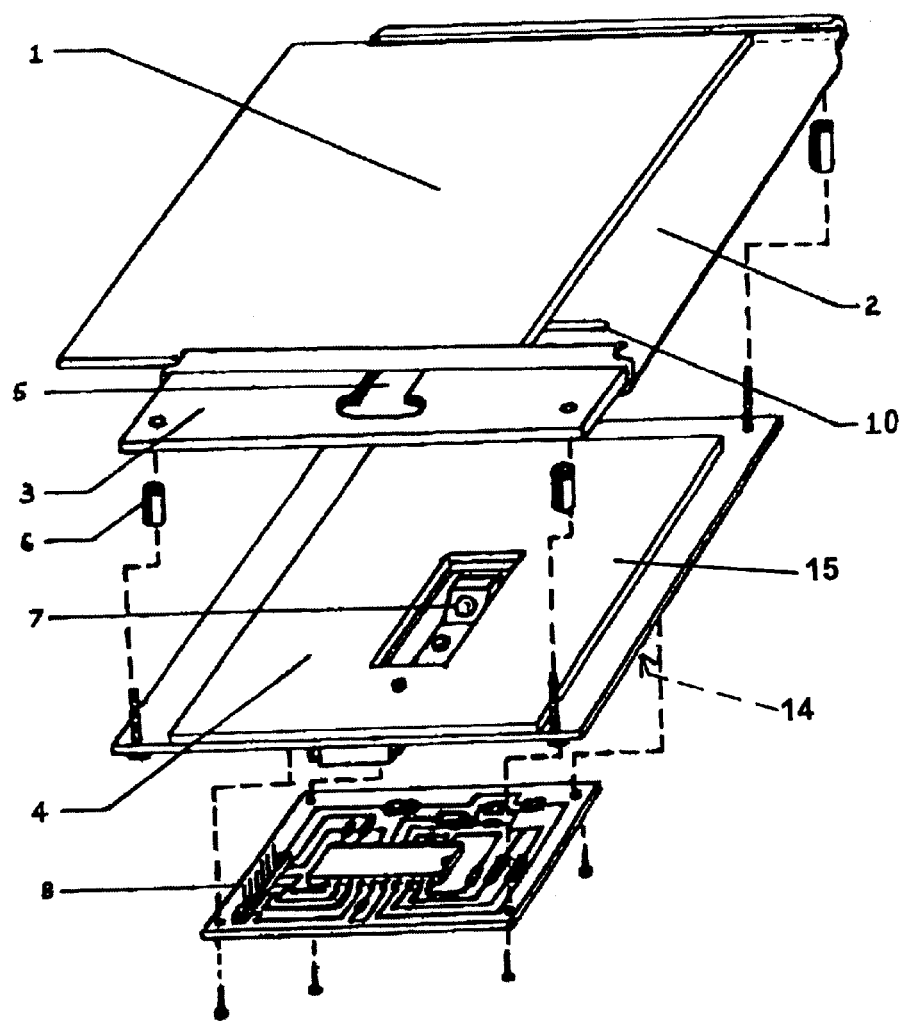
FIG. 1 is a blow-up view which illustrates the touch pad device for control of a cursor.
Figure 2:
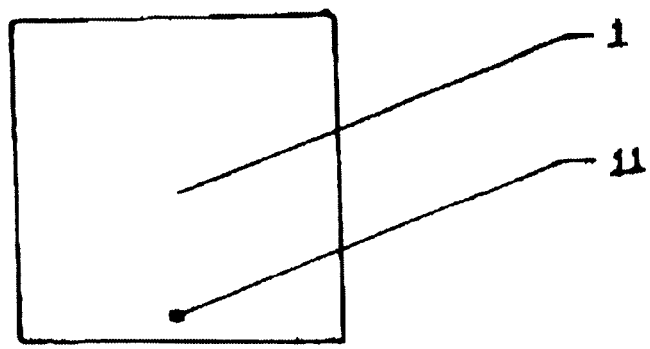
FIG. 2 contains views of each of the plates from below.
Figure 2:
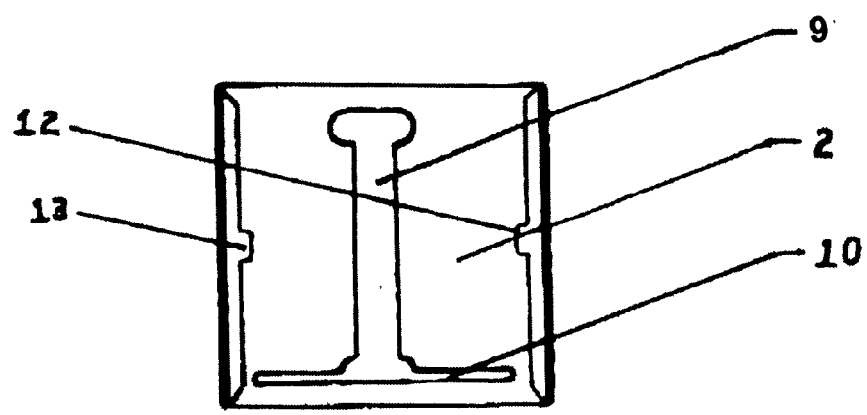
Figure 2:
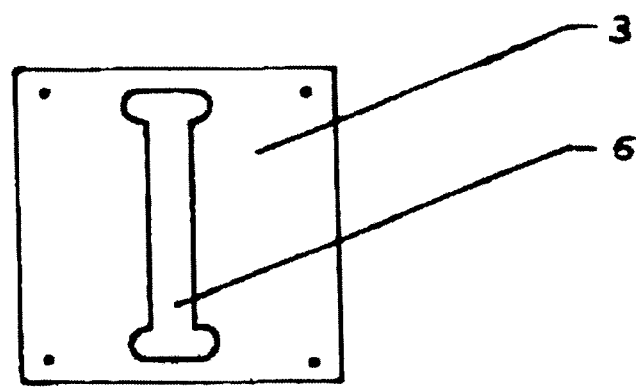
Figure 3:
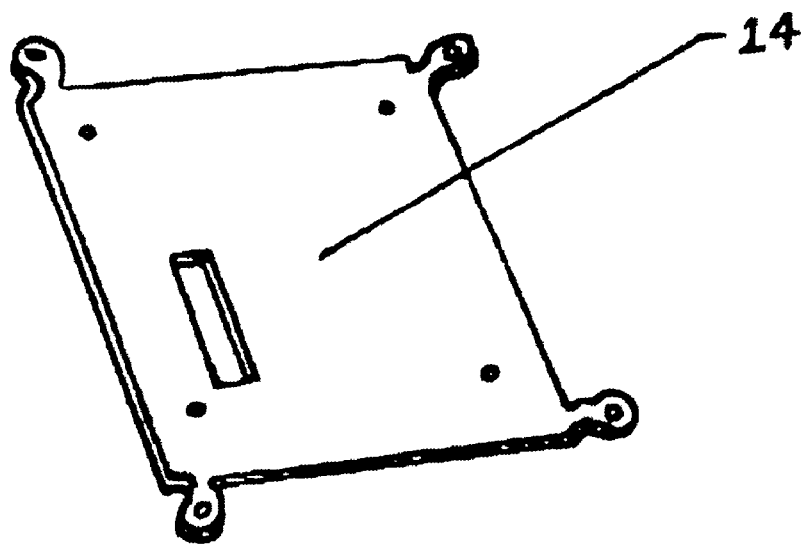
FIG. 3 is a view of the plastic frame.

As shown on FIGS. 1 and 2, the Duel-Dimension Cursor Control Pad utilizes a plate assembly comprising two movable plates (1 and 2) attached to a fixed plate (3). The upper moveable plate (1) is mounted on tracks on the top of the lower movable plate (2) so that a pin (11) on the underside the upper moveable plate (1) fits into a slot (10) cut out of the lower moveable plate (2). The pin (11) and slot (10) act in conjunction to provide "stops" limiting the movement of the upper moveable plate (1) relative to the lower moveable plate (2). This maintains contact between the moveable plates (1 and 2) and prevents exposure of the scanning device (7) such as an optical laser scanner as used in this embodiment, Infrared scanner or other scanners well known in the art that is mounted below the plate assembly.

The lower moveable plate (2) is mounted on the fixed plate (3) so as to be able to slide in a direction perpendicular to the movement of upper moveable plate (1), using tracks on the underside of the lower moveable plate (2). Fixed plate (3) is mounted to a felt (15)-covered main-circuit board containing the power supply and electronics associated with the scanning device (4) using bushings (6) to provide a set separation between the fixed plate (3) and the main-circuit board (4). The power supply and scanning device electronics can be of any variety well know to those skilled in the art. Tabs (12 and 13) in the tracks on the underside of the lower moveable plate (2) act in conjunction with the bushings (6) to provide "stops" limiting the movement of the lower moveable plate (2) relative to the fixed plate (3). This maintains contact between the lower moveable plate (2) and the fixed plate (3) and prevents exposure of the scanning device (7), which, in this embodiment, is an optical laser scanner that is mounted below the plate assembly.

This mounting arrangement enables an "X" axis movement of the upper moveable plate (1) and an "Y" axis movement of the lower moveable plate (2). This combination of movements of plates allow for the optical laser scanner (7) to register the movement of the upper moveable plate (1) through the slot (5) on the fixed plate (3) and a second slot (9) on the lower moveable plate (2).

The felt (15)-covered main circuit board (4) is felt covered and lubricated in order to lubricate tracks on the lower moveable plate (2) and to seal the optical laser scanner (7) from dust and contaminants. A transmitter circuit board (8), and the supporting electronic components on the transmitter circuit board (8), attaches to a plastic frame (14) and plug into the underside of the felt-covered main circuit board (4). In this embodiment the transmitter circuit board (8) and supporting electronic components is a wireless transmission system well know to those skilled in the art but any means of transmitting the output of the device to a desired receiving apparatus is included in the scope of this invention.

It is to be understood that the present invention is not limited to the embodiments described above, but encompasses any and all embodiments within the scope of the following claims.

I claim:

1. A mechanical input to electrical output device, comprising:

a plate assembly;

said plate assembly having an upper movable plate a lower movable plate and a fixed plate;

said upper moveable plate is movably attached to said lower movable plate by one or more upper tracks affixed on the topside of said lower movable plate and said lower moveable plate is movably attached to said fixed plate by one or more lower tracks on the underside of said lower moveable plate with said one or more lower tracks affixed perpendicular to said one or more upper tracks, such that said lower movable plate is capable of movement in a direction perpendicular to the movement of said upper moveable plate resulting in both X axis and Y axis movement of said upper movable plate relative to said fixed plate;

a scanning device for registering the X-axis and Y-axis movement of said upper movable plate and outputting such registration; and, a transmitter to transmit the output of said scanning device.

2. A mechanical input to electrical output device as claimed in claim 1, wherein said scanning device is located beneath said plate assembly such that it scans toward said plate assembly and registers the movement of said upper moveable plate through an opening in said fixed plate and an opening in said lower moveable plate.

3. A mechanical input to electrical output device as claimed in claim 2, wherein said scanning device is an optical laser scanner.

4. A mechanical input to electrical output device as claimed in claim 2, wherein said transmitter is a wireless transmitter circuit board and supporting electronic components.

5. A mechanical input to electrical output device as claimed in claim 4, wherein said optical laser scanner is contained on a main circuit board which is felt covered and said felt is lubricated in order to lubricate said one or more upper tracks and said one or more lower tracks on said lower moveable plate and to seal said optical laser scanner from dust and contaminants.

* * * * *